United States Patent [19]
Saegusa et al.

[11] Patent Number: 5,122,827
[45] Date of Patent: Jun. 16, 1992

[54] CAMERA PROVIDED WITH AN ATTITUDE DETECTING DEVICE

[75] Inventors: Takashi Saegusa; Kenji Isono, both of Kawasaki; Tetsuro Goto, Funabashi; Keiji Ohsawa, Yokohama, all of Japan

[73] Assignee: Nikon Corporation, Tokyo, Japan

[21] Appl. No.: 676,453

[22] Filed: Mar. 26, 1991

Related U.S. Application Data

[63] Continuation of Ser. No. 539,368, Jun. 15, 1990, abandoned, which is a continuation of Ser. No. 394,151, Aug. 14, 1989, abandoned, which is a continuation of Ser. No. 215,861, Jul. 6, 1988, abandoned.

[30] Foreign Application Priority Data

Jul. 7, 1987 [JP] Japan .................. 62-105165[U]
Jul. 7, 1987 [JP] Japan .................. 62-170604
Jul. 7, 1987 [JP] Japan .................. 62-170605

[51] Int. Cl.$^5$ .............................................. G03B 7/00
[52] U.S. Cl. .................................... 354/410; 354/432; 354/219
[58] Field of Search ................. 354/410, 432, 219

[56] References Cited

U.S. PATENT DOCUMENTS 4,364,650 5/1982 Terashita et al. ............... 354/31
4,566,775 1/1986 Tsunekawa ..................... 354/432

FOREIGN PATENT DOCUMENTS 2928766 2/1981 Fed. Rep. of Germany ...... 354/219
61-143133 9/1986 Japan.

Primary Examiner—Russell E. Adams
Attorney, Agent, or Firm—Shapiro and Shapiro

[57] ABSTRACT

A camera comprises a penta-roof prism, a plurality of inclined sensors respectively disposed at positions opposed to corresponding inclined planes of the prism, and an attitude detector for detecting the attitude of the camera in response to outputs of the sensors. Each sensor is capable of producing either of two outputs, and the outputs of the sensors are combined to produce a number of pieces of attitude information. This information is classified to provide a smaller number of pieces of attitude information from which the attitude of the camera is determined.

15 Claims, 12 Drawing Sheets (a)

(b)

(c)

(d)

(e)

(f)

FIG.1
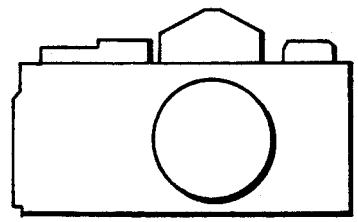
(a)
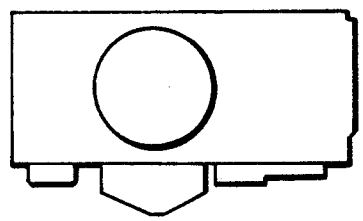
(b)
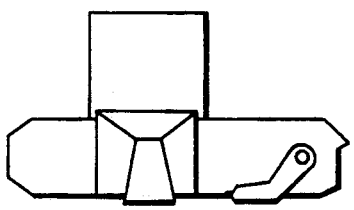
(c)
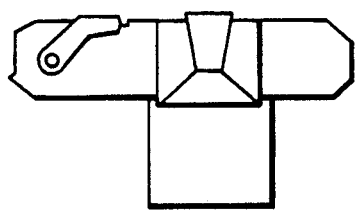
(d)
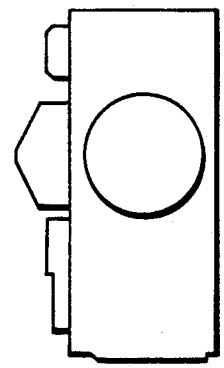
(e)
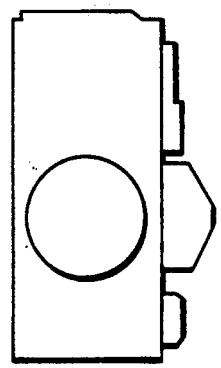
(f)

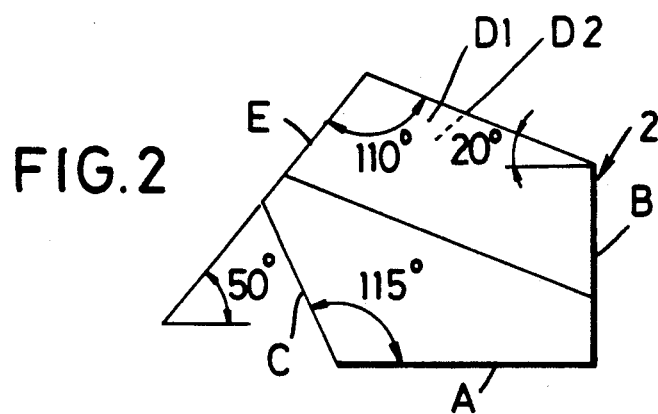
FIG.2
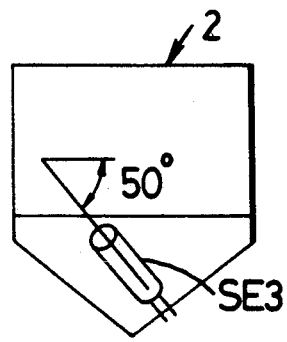
FIG.3A
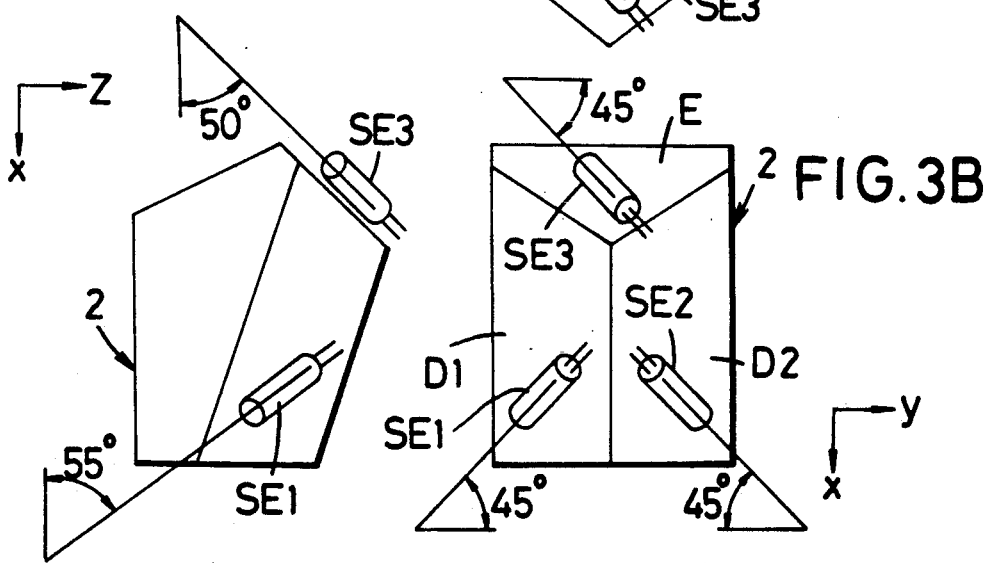
FIG.3C
FIG.3B
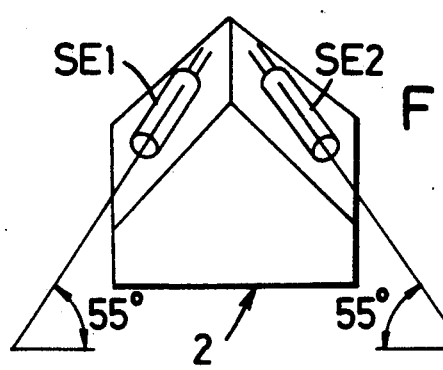
FIG.3D

FIG. 10
(a) 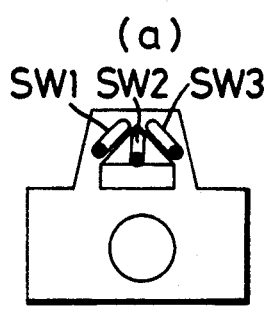
(b) 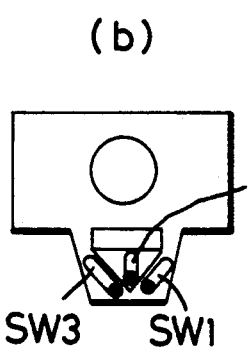
(c) 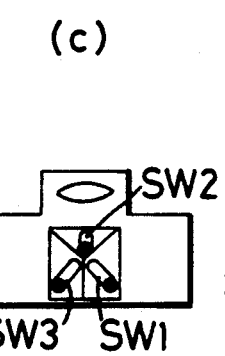
(d) 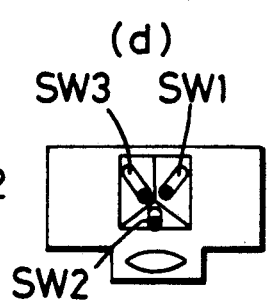
(e1) 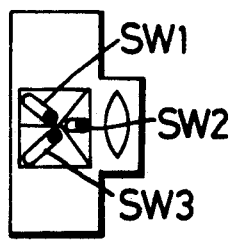
(e2) 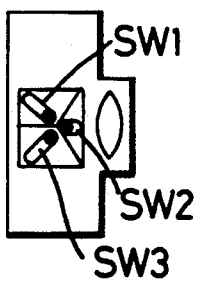
(f1) (f2) 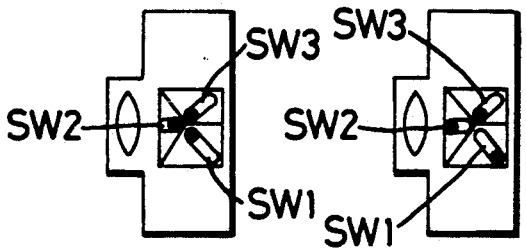

A/D CONVERSION

ATTITUDE DETECT

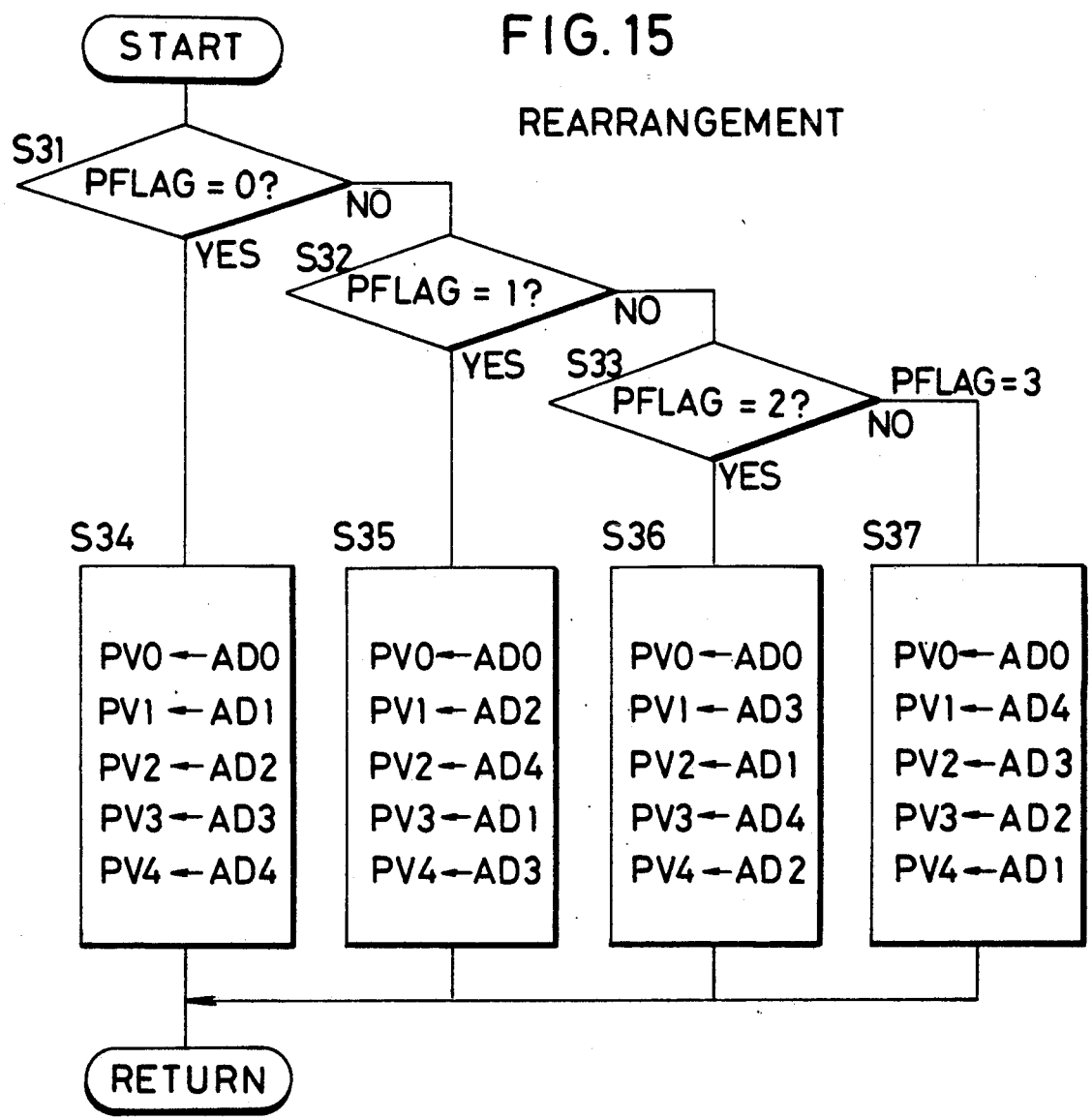

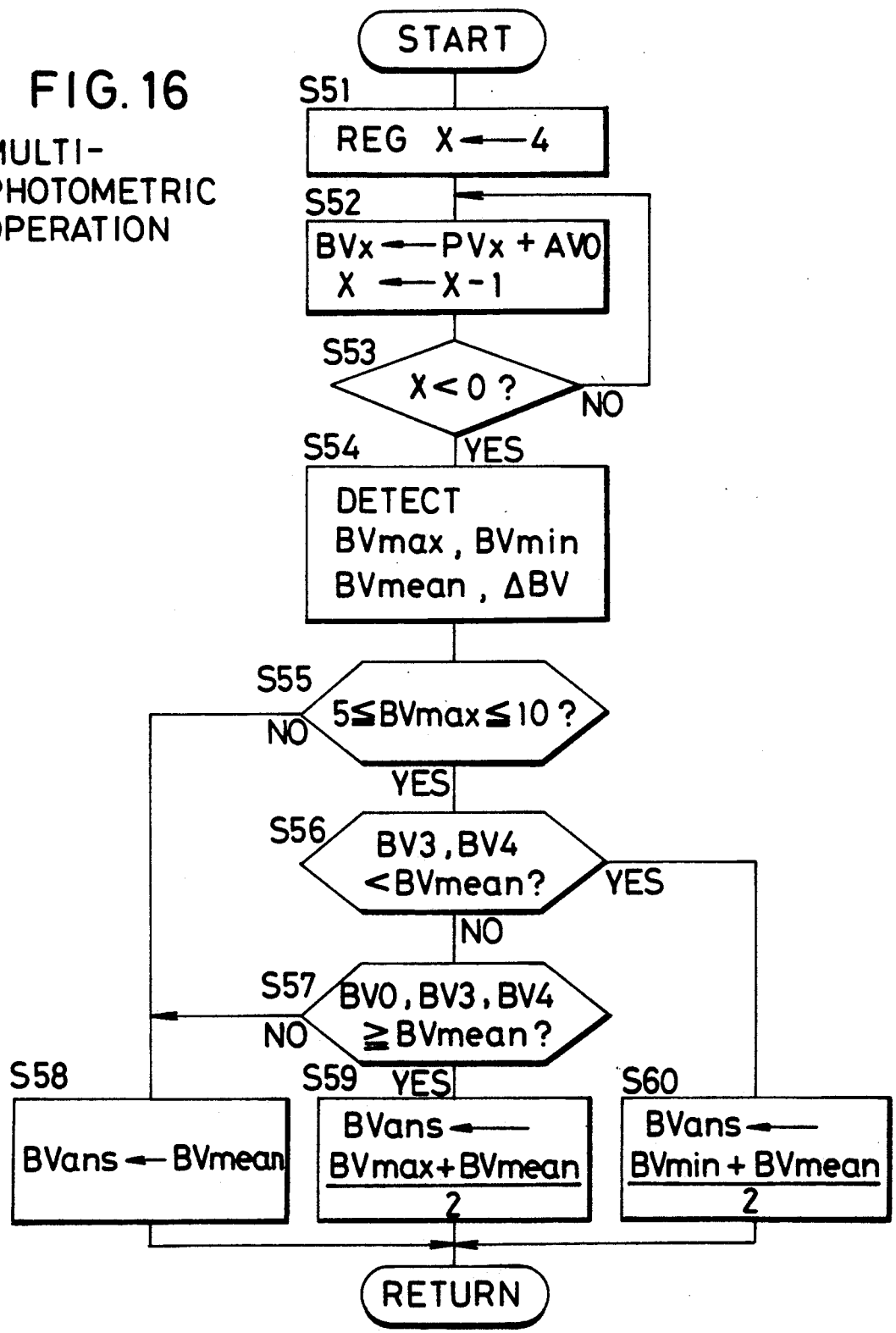

FIG.17A
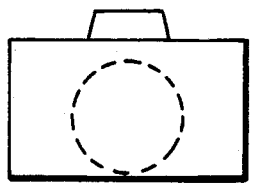
FIG.18A
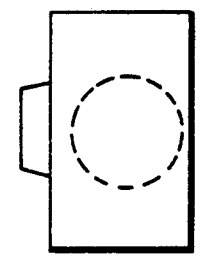
FIG.17B
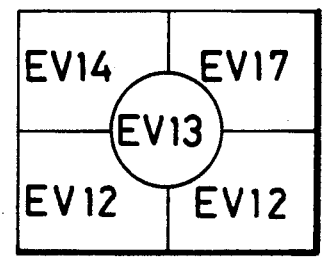
FIG.18B
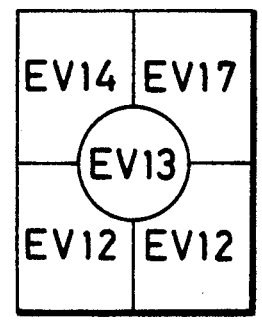
FIG.17C
| ADDRESS |      | ADDRESS |      |
|---------|------|---------|------|
| 00      | EV13 | 06      | EV13 |
| 01      | EV14 | 07      | EV14 |
| 02      | EV17 | 08      | EV17 |
| 03      | EV12 | 09      | EV12 |
| 04      | EV12 | 0A      | EV12 |
FIG.18C
| ADDRESS |      | ADDRESS |      |
|---------|------|---------|------|
| 00      | EV13 | 06      | EV13 |
| 01      | EV12 | 07      | EV14 |
| 02      | EV14 | 08      | EV17 |
| 03      | EV12 | 09      | EV12 |
| 04      | EV17 | 0A      | EV12 |

CAMERA PROVIDED WITH AN ATTITUDE DETECTING DEVICE

This is a continuation of application Ser. No. 539,368 filed Jun. 15, 1990, which is a continuation of application Ser. No. 394,151 filed Aug. 14, 1989, which is a continuation of application Ser. No. 215,861 filed Jul. 6, 1988, all three of which are now abandoned.

BACKGROUND OF THE INVENTION

1. Field of the Invention

This invention relates to an attitude detecting device for detecting the attitude of a camera by the use of a plurality of sensors, and to a multi-photo-metering apparatus using the same.

2. Related Background Art

The device disclosed in U.S. Pat. No. 4,364,650 is known as a camera attitude detecting device of this type. In that patent, there is shown an attitude sensor comprising mercury enclosed in a container and a plurality of sets of switches (sensors) having a pair of electrodes electrically connected together by the mercury, and one-dimensional attitude of the camera is detected by one of the pair of electrodes being ON.

Also, in Japanese Utility Model Application Laid-Open No. 61-143133, it is disclosed that when the direction of the optic axis is the x-axis and the horizontal direction orthogonal thereto is the y-axis and the vertical direction orthogonal to the x-axis and the y-axis is the z-axis, an attitude sensor is disposed within a camera so that the axial direction thereof is inclined with respect to any of the xy plane, the xz plane and the zy plane, whereby the switch state of the sensor is prevented from being indefinite.

In recent years, devices for detecting the three-dimensional attitude of a camera have been desired, and in this case, it is necessary to provide a plurality of sets of attitude sensors. Where, for example, three sets of such attitude sensors are provided, there are obtained $2^3 = 8$ kinds of signals. However, if all of these eight kinds of signals are used as camera attitude information, the operation process thereafter will become unnecessarily complicated.

Also, where the attitude sensors are disposed with their axes inclined, the disposition space required therefor leads to bulkiness of the camera. Particularly, to incline the three sets of sensors in different directions, it is necessary to provide a large space.

The aforementioned U.S. Patent further discloses a multi-photometering apparatus of a camera for dividing the object field into a plurality of areas and photometering them to thereby determine a proper exposure value, and teaches therein the technique of changing the weighting in conformity with the attitude of the camera when finding a mean luminance value.

In the prior art, however, the data from each photometering element has been discriminated in conformity with respective camera attitudes detected. Therefore, where in an attempt to effect complicated discrimination, the mean value of the photometric data of the photometering elements is compared with the photometric data of the ground side of the object field and the photometric data of the middle portion of the object field or the photometric data of the sky side to thereby provide an exposure value conforming to a low luminance example or an exposure value conforming to the mean luminance, the attitude of the camera must first be discriminated and in each attitude, the above-mentioned comparison and exposure operation must be effected for all the photometric data. That is, there has been the problem that the outputs of the attitude sensors and the algorithm which determines the proper exposure are in unseparable and it is difficult to apply a complicated algorithm.

SUMMARY OF THE INVENTION

It is a primary object of the present invention to provide a camera having an attitude sensor in which attitude detecting sensors are disposed along the inclined surfaces of a penta-roof prism, whereby no especially large space is required.

It is another object of the present invention to provide a camera attitude detecting device in which a plurality of detection signals obtained from a plurality of attitude sensors are classified into less pieces of attitude information than the number of said detection signals and used to thereby simplify the operation process.

It is still another object of the present invention to provide a multi-photometering apparatus in which photometric data are rearranged in addresses conforming to the attitude of a camera and normalized and stored to thereby solve the above-noted problem.

BRIEF DESCRIPTION OF THE DRAWINGS

FIGS. 1(a) to 1(f) illustrate the basic attitudes of a camera.

FIG. 2 is a side view of a penta-roof prism.

FIGS. 3A, 3B, 3C and 3D are a back view, a plan view, a side view and a bottom view, respectively, of a penta-roof prism on which sensors are disposed.

FIG. 10 illustrates the attitudes of the camera and the states of attitude detecting switches.

FIG. 15 is a flow chart of the sub-routine of rearrangement.

FIG. 16 is a flow chart of the sub-routine of the multi-photometric operation process.

FIGS. 17A, 17B, 17C, 18A, 18B and 18C illustrate the rearrangement of photometric outputs, FIGS. 17A and 18A being back views of the camera, FIGS. 17B and 18B showing photometering areas, and FIGS. 17C and 18C being tables showing the relations between the addresses of RAM and the contents stored therein.

DESCRIPTION OF THE PREFERRED EMBODIMENTS

Figure 4:
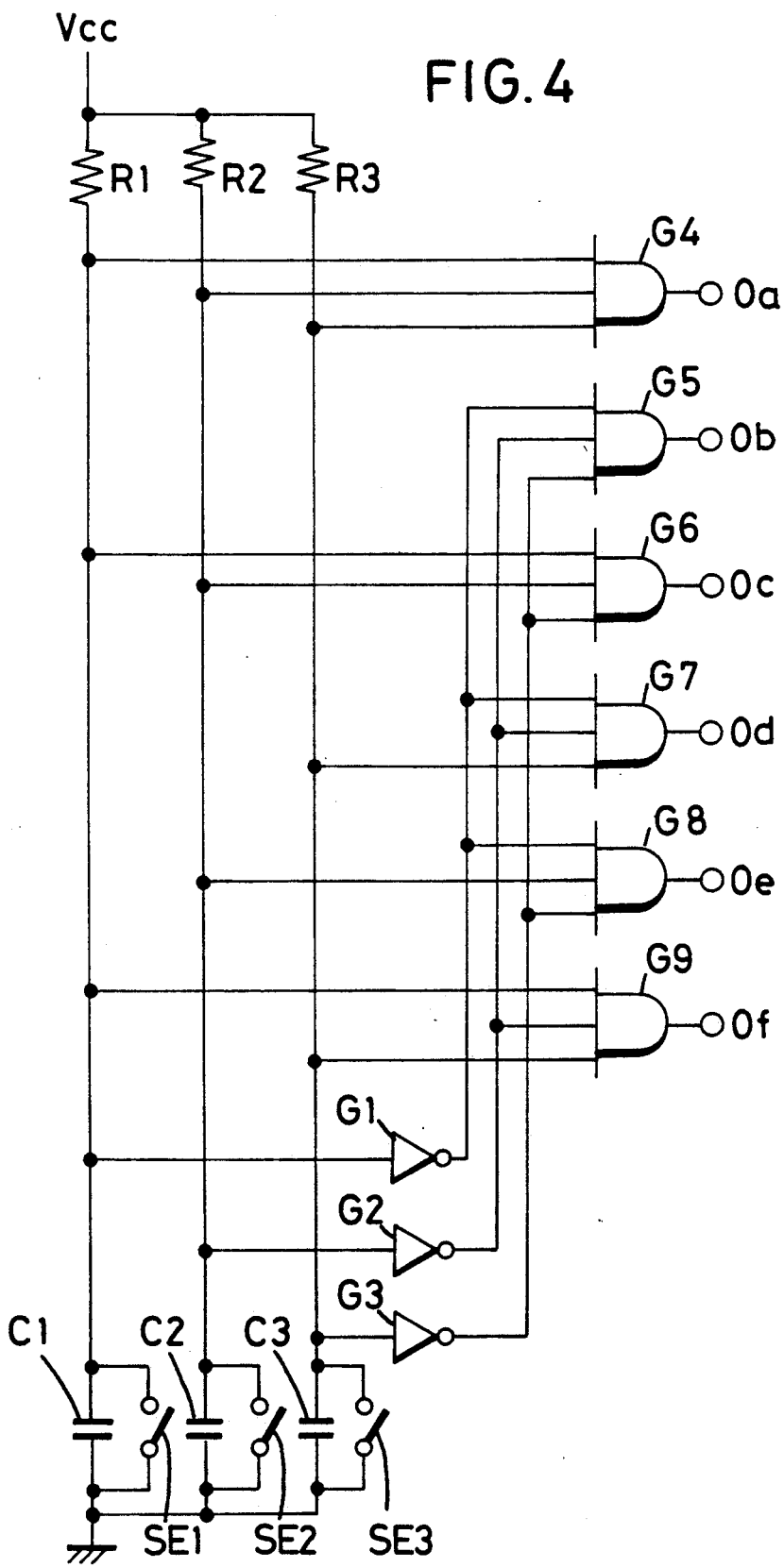
FIG. 4 is a block diagram of an attitude detecting circuit.

An embodiment of the attitude detecting device of a camera will hereinafter be described.

The six basic attitudes of a camera are the erect attitude shown in FIG. 1(a), the inverted attitude shown in FIG. 1(b), the upwardly and downwardly facing attitudes shown in FIGS. 1(c) and 1(d), respectively, and the laterally facing attitudes shown in FIGS. 1(e) and 1(f), respectively.

To detect such six kinds of attitudes, three of the above-described inclined sensors are necessary. In order that the states of three switches may not be indefinite, the inclined sensors should be disposed so as not to be horizontal at any one of the attitudes shown in FIG. 1. Ideally, it is preferable that the three inclined sensors be disposed while being inclined at an angle of 45° with respect to the horizontal plane when the camera is at any attitude, but if the inclined sensors are disposed at an angle of generally 45°±10° (35°-55°), no problem will arise in the detection of the six kinds of attitudes.

The three inclined sensors SE1, SE2 and SE3 are secured to respective ones of the inclined optically non-functional surfaces of a penta-roof prism 2.

FIG. 2 shows the shape of a popular penta-roof prism. The angles shown therein may assume somewhat different numerical values from various optical conditions, but numerical values which generally seem to be the typical values of the penta-roof prism are shown as an example. Accordingly, the penta-roof prism of these angles is not restrictive.

The penta-roof prism 2 has optically functional surfaces and optically non-functional surfaces. The optically functional surfaces are an incidence surface A on which the object light from a photo-taking lens is incident and an emergence surface B from which the light emerges to an eyepiece, and the other surfaces are the optically non-functional surfaces C-E, which are provided with a protective coating. In the present embodiment, three sensors are disposed along the roof surfaces D1 and D2 and the surface E, respectively.

FIGS. 3A-3D are four surface views in which the three sensors SE1, SE2 and SE3 are secured to the penta-roof prism 2 shown in FIG. 2. Each sensor is a conventional switch having two electrodes protruding into a cylindrical container and mercury enclosed therein, and the mercury moves in accordance with gravity to cause the electrodes to conduct. These sensors each form an angle of 45° with respect to the y-axis, and are secured to respective surfaces D1, D2 and E parallel thereto. Thus, each sensor forms the shown angles with respect to the x-axis and the z-axis, respectively. That is, each sensor is disposed so as to form an angle of 45°-55° with respect to the x-axis, the y-axis and the z-axis, respectively, and this is a substantially ideal arrangement for the detection of the six kinds of attitudes of the camera.

The sensors SE1, SE2 and SE3 are ON and OFF as shown in Table 1 below for the six kinds of camera attitudes shown in FIGS. 1(a)-1(f).

TABLE 1

| FIG. 1 | SE1 | SE2 | SE3 |
|---|---|---|---|
| (a) | OFF | OFF | OFF |
| (b) | ON | ON | ON |
| (c) | OFF | OFF | ON |
| (d) | ON | ON | OFF |
| (e) | ON | OFF | ON |
| (f) | OFF | ON | OFF |

An example of a circuit for detecting the attitudes of the camera by the use of the three sensors is shown in FIG. 4.

Switches SE1, SE2 and SE3 correspond to the three sensors shown in FIGS. 3A-3D. One terminal of each switch is grounded and the other terminal is pulled up to a voltage source Vcc through resistors R1, R2 and R3. Accordingly, when each switch is ON, the output of each switch assumes a low level, and when each switch is OFF, the output of each switch assumes a high level. The voltage source side terminal of the switch SE1 is directly connected to the input terminals of AND gates G4, G6 and G7 and is also connected to the input terminals of AND gates G5, G8 and G9 through an inverter G1. The voltage source side terminal of the switch SE2 is directly connected to the input terminals of the AND gates G4, G5 and G7 and is also connected to the input terminals of the AND gates G6, G8 and G9 through an inverter G2. The voltage source side terminal of the switch SE3 is directly connected to the input terminals of the AND gates G4, G6 and G8 and is also connected to the input terminals of the AND gates G5, G7 and G9 through an inverter G3. Capacitors C1, C2 and C3 forming time constants with resistors R1, R2 and R3 are connected to the both ends of the respective switches, whereby the chattering of each switch and the fluctuation of the output of each switch by minute vibration of the camera attitudes are prevented. Also, terminals Oa, Ob, Oc, Od, Oe and Of are connected to the output terminals, respectively, of the gates G4, G5, G6, G7, G8 and G9.

When this circuit is used, the outputs of the output terminals Oa-Of in the states of FIGS. (a)-1(f) are as shown in Table 2 below.

TABLE 2

| FIG. 1 | Oa | Ob | Oc | Od | Oe | Of |
|---|---|---|---|---|---|---|
| (a) | H | L | L | L | L | L |
| (b) | L | H | L | L | L | L |
| (c) | L | L | H | L | L | L |
| (d) | L | L | L | H | L | L |
| (e) | L | L | L | L | H | L |
| (f) | L | L | L | L | L | H |

For example, when the camera is in the erect attitude of FIG. 1(a), the switches SE1, SE2 and SE3 are all OFF and therefore, the inputs of the AND gate G4 all assume a high level. Accordingly, the output terminal Oa of the AND gate G4 assumes a high level. Two of the inputs of the AND gate G5 assume a low level and therefore, the output terminal Ob of the AND gate G5 assumes a low level. Likewise, the output terminals Oc, Od, Oe and Of assume a low level. In a similar manner, for the respective camera attitudes of FIGS. 1(a)-1(f), the outputs of the output terminals Oa-Of are such as shown in Table 2.

As can be seen from Table 2, the high level outputs of the terminals Oa-Of correspond to the camera attitudes of FIGS. 1(a)-1(f) and therefore, the camera attitudes can be known by monitoring the levels of the respective terminals.

A circuit for controlling the exposure in conformity with a camera attitude detected as described above will now be described with reference to FIG. 5.

Figure 5:
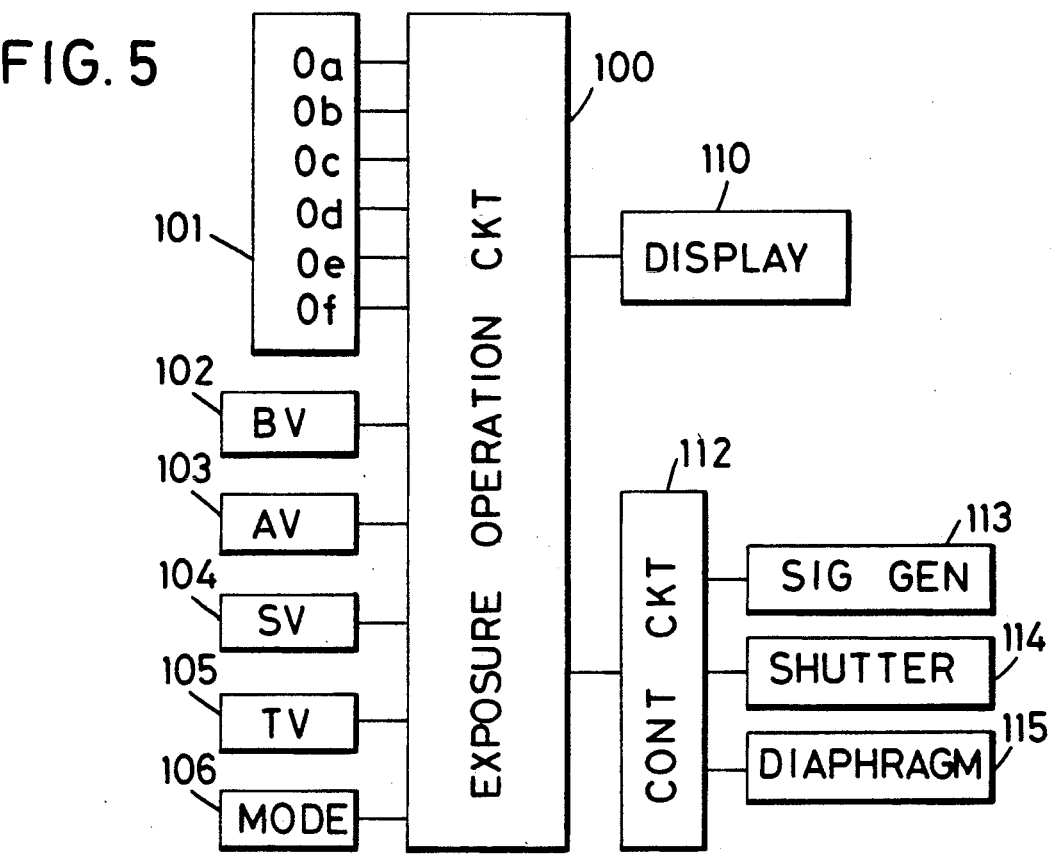
FIG. 5 is a block diagram of an exposure control circuit.

In FIG. 5, an attitude detecting circuit 101 is the circuit shown in FIG. 4 and inputs six kinds of signals from the respective terminals Oa–Of to an exposure operation circuit 100 in conformity with the camera attitudes. An object luminance information circuit 102 divides the photometering area of the camera into a plurality of portions, and a photometering element is disposed in each of the divided portions and transmits the luminance information of each portion. A lens aperture information circuit 103 inputs a signal conforming to the input aperture value to the exposure operation circuit 100, a film speed information circuit 104 inputs a signal conforming to the input film speed to the exposure operation circuit 100, a shutter speed information circuit 105 inputs a signal conforming to the input shutter speed to the exposure operation circuit 100, and a mode change-over circuit 106 inputs a signal conforming to the input exposure mode to the exposure operation circuit 100. The exposure operation circuit 100 suitably selects a combination of information from each information in conformity with the mode change-over circuit 106 and effects an operation, and transmits the output thereof to a display circuit 110 and a control circuit 112. When effecting the operation of the exposure on the basis of the luminance information of each portion of the photometering area divided into a plurality of portions which has been transmitted from the object luminance information circuit 102, the exposure operation circuit 100 may alter the algorithm thereof in conformity with the camera attitude information detected by the attitude detecting circuit 101.

If for example, the aperture priority mode is selected by the mode change-over circuit 106, the exposure operation circuit 100 effects exposure operation in accordance with each input information and outputs a signal indicative of a proper shutter speed. The display circuit 110 displays a proper shutter speed or a proper aperture value within a finder or the like. Also, the control circuit 112 drives a shutter blade 114 and diaphragm 115 on the basis of a signal from the exposure operation circuit 100 and a sequence signal produced from a signal output circuit 113 at a predetermined timing in response to an upward mirror movement started by the operation of a release button, not shown.

Figure 6A:
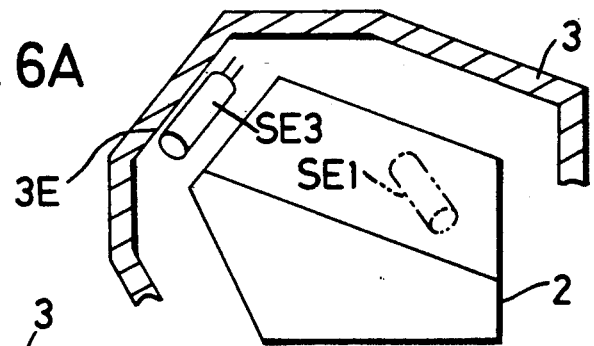
FIGS. 6A and 6B are cross-sectional views showing modifications of the arrangement of attitude sensors.
Figure 6B:
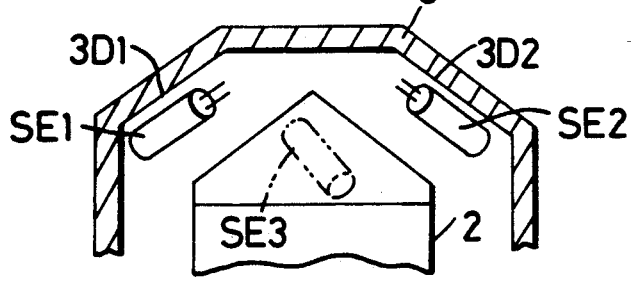

FIGS. 6A and 6B show an example of a modification in which the sensors SE1, SE2 and SE3 are secured to the inner wall of a cover member 3 having surfaces substantially parallel to the optically non functional surfaces D1, D2 and E of the penta-roof prism 2.

The shape of the cover 3 which covers the penta roof prism 3 is governed by the design elements as well, but in most cases, it has surfaces substantially parallel to the roof surfaces D1 and D2 and the front inclined surface E of the penta-roof prism 2. So, the sensors SE1, SE2 and SE3 are secured to the inner surfaces $3D_1$, $3D_2$ and 3E, respectively, of the cover which are opposed to the optically non-functional surfaces D1, D2 and E. Thereby, the efficiency of the space for disposing the switches therein can be achieved as in the first embodiment. Particularly, where the cover 3 is a molded plastic article, the sensors can be inserted into the cover 3 to thereby utilize the space more efficiently.

Where an electric circuit substrate such as a flexible printed substrate is provided along the optically non functional surfaces D1, D2 and E of the penta-roof prism, the attitude detecting sensors may be directly disposed on that substrate. In this case, there is no necessity of specially drawing around a lead wire or the like for connecting the two, and this leads to the advantage that the portions around the switches are simplified.

A description will now be given of a second embodiment in which the attitude detecting device of the present invention is applied to a multi-photometric apparatus.

Figure 7:
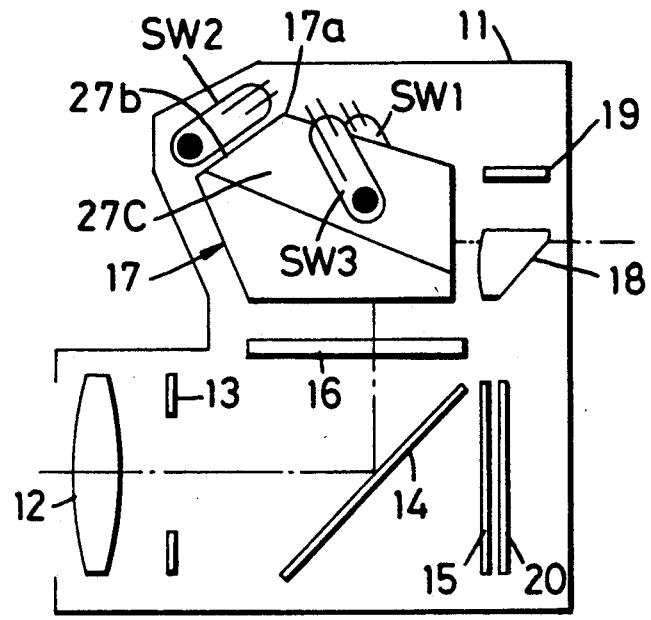
FIG. 7 is a cross-sectional view of a camera according to a second embodiment of the present invention.
Figure 8:
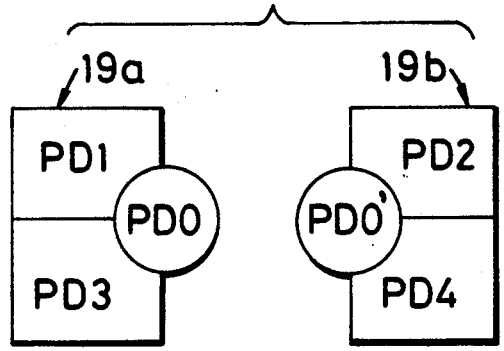
FIG. 8 illustrates light-receiving elements.

FIG. 7 shows a cross-section of a single-lens reflex camera provided with a multi-photometric apparatus. A photo taking lens 12, a diaphragm 13, a mirror 14, a shutter 15, a screen 16, a penta-roof prism 17, a pair of condensing lenses 18 and a pair of light-receiving elements 19 (one lens 18 and one element 19 being seen in FIG. 7) are disposed in place within the outer cover 11 of the camera. The pair of condensing lenses 18 are disposed at the opposite sides of an eyepiece, not shown, and cause the image of the object field formed on the screen 16 to be re-imaged on the pair of light-receiving elements 19. Each of the light-receiving elements each is formed by a three segment silicon photodiode as shown in FIG. 8. One light-receiving element 19a consists of PD1 chiefly having charge of the left side of the object field and receiving the left upper portion, PD3 receiving the left lower portion and PD0 receiving the middle portion. The other light-receiving element 19b consists of PD2 chiefly having charge of the right side of the object field and receiving the right upper portion, PD4 receiving the right lower portion and PD0' having charge of the middle portion. With regard to the middle portion, the left and right photodiodes PD0 and PD0' are parallel-connected.

Also, switches SW1–SW3 constituting attitude sensors are disposed along the respective inclined surfaces of the penta roof prism 17. That is, the switches SW1–SW3 are disposed between the three inclined surfaces 27b, 27c, 27d (a surface not shown and symmetrical with the inclined surface 27c) containing the vertex 17a of the penta-roof prism 17 and the outer cover 11 so that all the switches are OFF when the camera is leveled in its erect position (with the penta roof prism 17 facing upward).

Figure 9A:
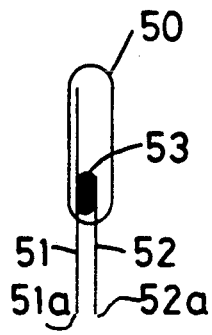
FIGS. 9A, 9B and 9C show an attitude detecting switch.
Figure 9B:
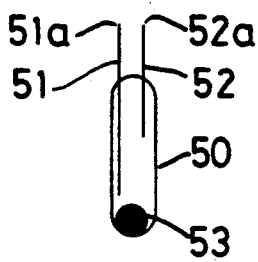
Figure 9C:
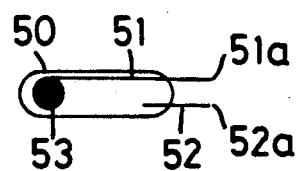

These switches SW1–SW3 as shown in FIGS. 9A–9C, are constructed by disposing metal pieces 51 and 52 of different lengths in a cylindrical container 50, extending the respective metal pieces as electrodes 51a and 52a out of the cylindrical container 50, and enclosing mercury 53 in the cylindrical container 50. When the electrodes 51a and 52a face downward as shown in FIG. 9A, the metal pieces 51 and 52 electrically conduct through the mercury 53; when the electrodes 51a and 52a face upward as shown in FIG. 9B, the mercury 53 moves toward the opposite side of the electrodes from gravity and therefore the metal pieces 51 and 52 are electrically isolated and when the electrodes 51a and 52a are in their horizontal position as shown in FIG. 9C, the mercury 53 can assume any position in the cylindrical container 50 and therefore the conductive state between the metal pieces 51 and 52 is indefinite. It is for the purpose of smoothing the movement of the mercury 53 that the metal piece 51 is longer than the metal piece 52.

Since this attitude sensor is comprised of three switches SW1–SW3, there are $2^3 = 8$ kinds of states of the switches, and the switch states shown in Table 3 below are assumed for the attitudes of the camera.

TABLE 3

| FIG. 10 | SW1 | SW2 | SW3 |
| --- | --- | --- | --- |
| a | OFF | OFF | OFF |
| b | ON | ON | ON |
| c | OFF | ON | OFF |
| d | ON | OFF | ON |
| e1 | ON | OFF | OFF |
| e2 | ON | ON | OFF |
| f1 | OFF | ON | ON |
| f2 | OFF | OFF | ON |

The states shown in Table 3 will now be described with reference to FIG. 10.

When the camera is in its erect position, that is, when the penta roof prism 17 faces the sky, the switches SW1, SW2 and SW3 are all OFF (FIG. 10(a)). On the other hand, when the camera is in its inverted position, that is, when the penta-roof prism 17 faces the ground, all the switches SW1, SW2 and SW3 are ON (FIG. 10(b)). When the camera faces upward, that is, when the photo-taking lens 12 faces the sky, only the switch SW2 is ON (FIG. 10(c)), and when the camera faces downward, that is, when the phototaking lens 12 faces the ground, the switches SW1 and SW3 are ON and the switch SW2 is OFF (FIG. 10(d)). When the camera faces leftwardly and upwardly, the switch SW1 is ON and the switch SW3 is OFF, but the switch SW2 is in its horizontal position and therefore may assume two kinds of states, i.e., ON and OFF (FIGS. 10(e1)) and 10(e2)). When the camera faces rightwardly and upwardly, that is, when the switch SW3 lies on the sky side as shown in FIGS. 10(f1) and 10(f2), the switch SW1 is OFF and the switch SW3 is ON, but the switch SW2 is in its horizontal position and therefore may assume two kinds of states, i.e., ON and OFF.

The number of the switches is not limited to three as in the embodiment, but may be two or more.

Figure 11:
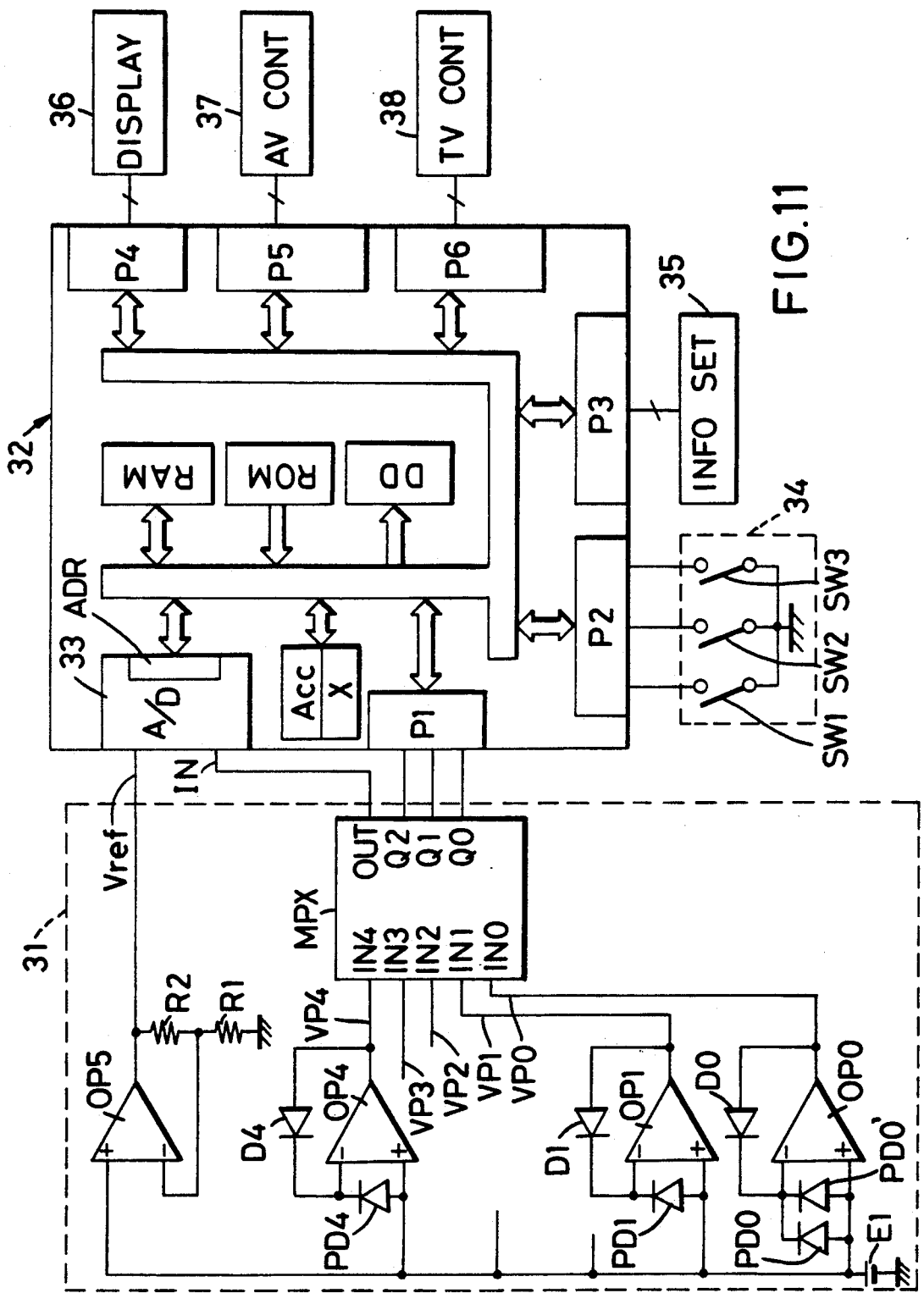
FIG. 11 is a block diagram of a control device.

FIG. 11 shows an embodiment of the control device.

In this embodiment, the object field is divided into five areas as shown in FIG. 8, and a multi-photometering circuit 31 obtains five photometric outputs $v_{p0}-V_{p4}$ corresponding to the respective areas. Accordingly, this photometering circuit 31 has six light-receiving elements PD0, PD0' and PD1-PD4 (PD2 and PD3 being not shown) corresponding to FIG. 8, and the light receiving elements PD0 and PD0' for photometering the central portion are parallel-connected to each other and connected to the input terminal of an operational amplifier OP0. A diode D0 is connected to the feedback system of the operational amplifier, and the reference voltage V1 of a reference voltage source E1 is input to the non-inverting input terminal of the operational amplifier OP0. A well-known photometering circuit is formed thereby and a photometric output $V_{p0}$ is obtained. Likewise, photometering circuits for the respective areas are constituted by operational amplifiers OP-1-OP4 and diodes D1-D4 correspondingly to the light-receiving elements PDI-PD4.

Also, the photometering circuit 31 has an operational amplifier OP5. This operational amplifier OP5 receives the reference voltage V1 by its non-inverting input terminal, and obtains an output $$V2 = \{(R1+R2)/R1\}V1$$

by the resistors R1 and R2 of the feedback system. The output of this operational amplifier OP5 is connected to the reference input terminal $V_{ref}$ of the A/D converter 33 of a microcomputer (hereinafter referred to as the MCU) 32 which will be described later, and causes the A/D converter 33 to function.

The photometric outputs of the five areas produced at the output ends of the respective operational amplifiers as described above are input to the analog input terminals $IN_0$, $IN_1$, ..., $IN_4$, respectively, of a multiplexer MPX. The multiplexer MPX selects any one of the analog inputs input to the input terminals $IN_0$, $IN_1$, ..., $IN_4$ for selective inputs $Q_2$, $Q_1$ and $Q_0$ as shown in Table 4 below and outputs it to an output terminal OUT. The selective inputs $Q_2-Q_0$ are connected to the output port P1 of the MCU 32 which will be described later, and the output terminal OUT is input to the input terminal IN of the A/D converter 33 of the MCU 32. The MCU 32 controls the selective inputs $Q_2-Q_0$ of the multiplexer MPX by the output port P1, selects any one of the five-divided photometric outputs $V_{p0}$, $V_{p1}-V_{p4}$ input to the analog input terminals $IN_0-IN_4$ of the multiplexer MPX and outputs it to the output terminal OUT, and reads the five photometric outputs $V_{p0}-V_{p4}$ in succession from the input terminal IN of the A/D converter 33 of the MCU 32.

TABLE 4

| $Q_2$ | $Q_1$ | $Q_0$ | OUT | Corresponding photometric output |
| --- | --- | --- | --- | --- |
| L | L | L | $IN_0$ | $V_{p0}$ |
| L | L | H | $IN_1$ | $V_{p1}$ |
| L | H | L | $IN_2$ | $V_{p2}$ |
| L | H | H | $IN_3$ | $V_{p3}$ |
| H | L | L | $IN_4$ | $V_{p4}$ |

The MCU 32 comprises a well-known microcomputer, and therein, a read-only memory ROM for storing a program and reference data or the like, a random access memory RAM for storing data being operated, a command decoder DD for executing the program stored in the ROM, an accumulator Acc, a register X, the A/D converter 33, various input and output ports $P_1-P_6$, etc. are functionally connected through a bus line. The terminals $Q_2-Q_0$ of the multiplexer MPX of the photometering circuit 31 are connected to the port $P_1$ as previously described, and the output terminal OUT of the multiplexer MPX is connected to the input terminal IN of the A/D converter 33 and the output terminal of the operational amplifier OP5 is connected to the terminal $V_{ref}$, whereby A/D conversion of the five photometric outputs becomes possible.

The above-described three switches SW1-SW3 constituting the attitude sensor 34 are connected to the port $P_2$ of the MCU 32, and camera attitude information is read thereby. Also, an information setting device 35 is connected to the port $P_3$, and contents manually set by the operator of the camera, such as the mode, aperture value and shutter speed of the camera and contents automatically set by the mounting of an accessory device such as the photo-taking lens are input thereto. Further, a display device 36 for displaying various types of information is connected to the port $P_4$, and a diaphragm control device 37 and a shutter control device 38 drivingly controlled to obtain a proper exposure operated by the MCU 32 are connected to the ports $P_5$ AND $P_6$, respectively.

The RAM of the MCU 32 has allotted thereto the area of information to be stored in each address as shown in Table 5 below.

TABLE 5

| Address | Contents | |
| --- | --- | --- |
| 00 | $AD_0$: | A/D converted value of $V_{p0}$ |
| 01 | $AD_1$: | A/D converted value of $V_{p1}$ |
| 02 | $AD_2$: | A/D converted value of $V_{p2}$ |
| 03 | $AD_3$: | A/D converted value of $V_{p3}$ |
| 04 | $AD_4$: | A/D converted value of $V_{p4}$ |
| 05 | PFLAG: | Attitude information |
| 06 | $PV_0$: | Photometric output after rearrangement |
| 07 | $PV_1$: | Photometric output after rearrangement |
| 08 | $PV_2$: | Photometric output after rearrangement |
| 09 | $PV_3$: | Photometric output after rearrangement |
| 0A | $PV_4$: | Photometric output after rearrangement |
| 0B | $BV_0$: | Luminance value |
| 0C | $BV_1$: | Luminance value |
| 0D | $BV_2$: | Luminance value |
| 0E | $BV_3$: | Luminance value |
| 0F | $BV_4$: | Luminance value |
| 10 | MODE: | Set mode information |
| 11 | AVO: | Open aperture value |
| 12 | AV: | Aperture value |
| 13 | TV: | Shutter speed |
| 14 | SV: | Film speed |
| 15 | $BV_{max}$: | Maximum luminance value |
| 16 | $BV_{mean}$: | Mean luminance value |
| 17 | $BV_{min}$: | Minimum luminance value |
| 18 | $\Delta BV$: | Luminance difference |
| 19 | $BV_{ans}$: | Proper luminance value |

The A/D converted values $AD_0$-$AD_4$ of the analog photometric output values $V_{p0}$-$V_{p4}$ obtained by effecting five-division photometering are stored in addresses 00 to 04, respectively. The camera attitude information PFLAG determined by the states of the switches SW1, SW2 and SW3 of the attitude sensor 34 is stored in address 05. The A/D converted values of the respective portions in which the A/D converted values $AD_0$-$AD_4$ of the photometric outputs stored in addresses 00 to 04 have been rearranged in conformity with the camera attitude information PFLAG stored in address 05, i.e., normalized photometric outputs $PV_0$-$PV_4$, are stored in addresses 06 to 0A. The luminance values $BV_0$-$BV_4$ of the respective areas resulting from converting the photometric outputs $PV_0$-$PV_4$ stored in addresses 06 to 0A into luminance values with the open aperture value AVO stored in address 11 being added thereto are stored in addresses 0B to 0F. The set mode information MODE is stored in address 10, the open aperture value AVO of the photo-taking lens is stored in address 11, the aperture value AV of the photo-taking lens is stored in address 12, the shutter speed TV is stored in address 13, and the film speed SV is stored in address 14. Further, various parameters necessary in the process of multi-photometric operation are stored in addresses 15 to 19. That is, the maximum luminance value $BV_{max}$ of the five luminance values is stored in address 15, the mean luminance value $BV_{mean}$ is stored in address 16, the minimum luminance value $BV_{min}$ is stored in address 17, the luminance difference $\Delta BV$ is stored in address 18, and the proper luminance value $BV_{ans}$ which is the result of the operation is stored in address 19. Various parameters, etc. used in the succeeding process are stored in the following addresses.

The procedure of the exposure operation process will now be described.

Figure 12A:
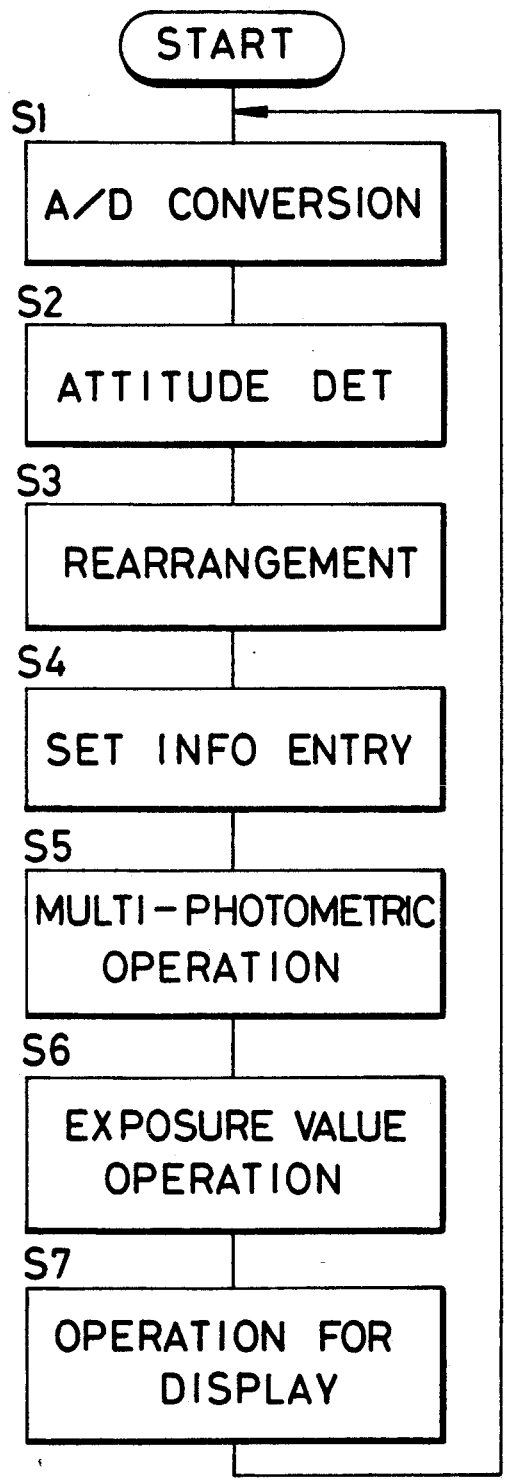
FIG. 12A is a flow chart of the main routine.
Figure 13:
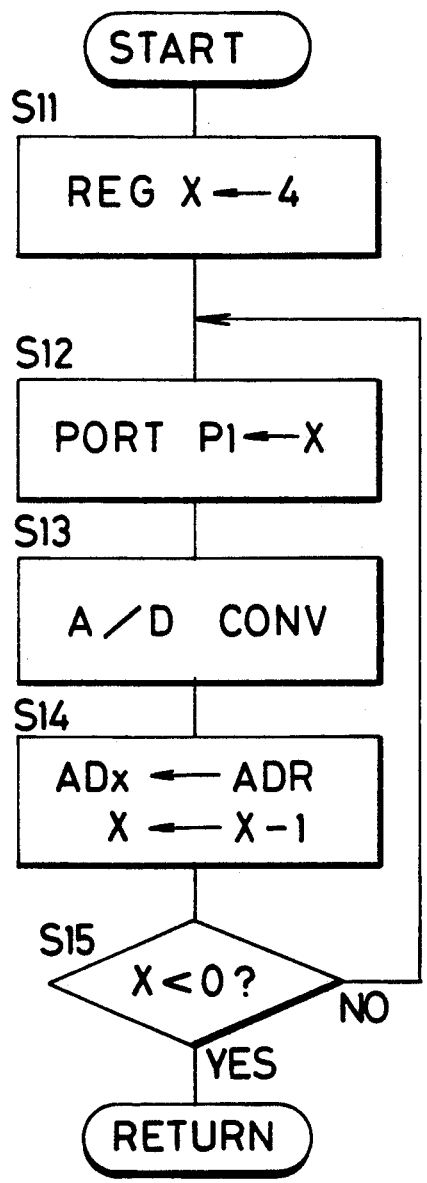
FIG. 13 is a flow chart of the sub-routine of A/D conversion.
Figure 14:
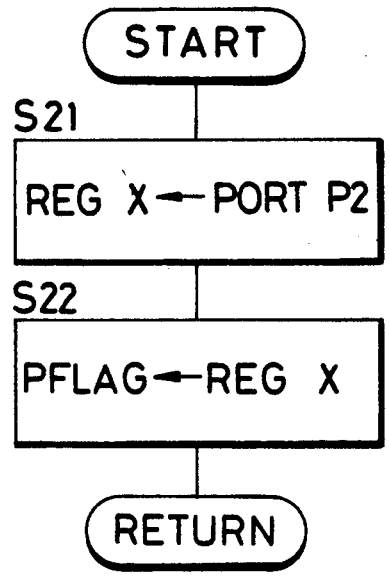
FIG. 14 is a flow chart of the sub-routine of the attitude detecting process.

FIG. 12A shows a flow-chart of the main routine of the MCU 32. At step S1, the sub-routine of the A/D conversion shown in FIG. 13 is called and the analog photometric outputs of the respective areas of the photometering circuit 31 are A/D converted to thereby obtain the A/D converted values $AD_0$-$AD_4$ of the respective areas, and the contents thereof are stored in addresses 00 to 04. Next, at step S2, the subroutine of the camera attitude detection shown in FIG. 14 is called, and the camera attitude information PFLAG is determined by the states of the switches SW1-SW3 of the attitude sensor 34 and is stored in address 05. When advance is made to step S3, the sub-routine of the rearrangement shown in FIG. 15 is called, and rearrangement of the A/D converted values $AD_0$-$AD_4$ stored in addresses 00 to 04 is effected on the basis of the attitude information PFLAG stored in address 05, and these rearranged A/D converted values are stored as photometric outputs $PV_0$-$PV_4$ in addresses 06 to 0A.

Figure 12B:
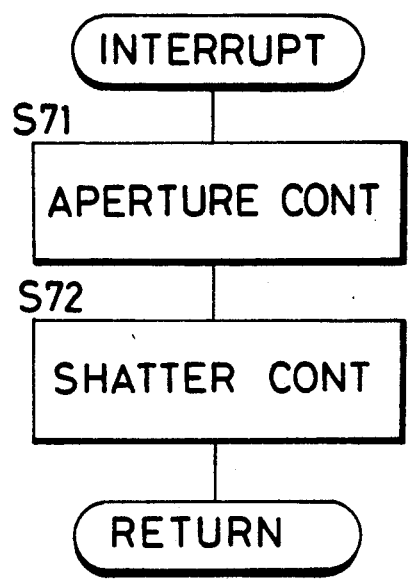
FIG. 12B is a flow chart of the interrupt processing routine.

At step S4, entry of the set values is effected. That is, the mode information set by the photographer operating the camera is stored into address 10, the information of the open aperture value AVO determined by the mounted photo-taking lens is stored into address 11, and if the photography mode is the aperture priority mode, the set aperture value AV is stored into address 12, and if the photography mode is the shutter speed priority mode, the set shutter speed TV is stored into address 13 and further, the information SV of the film speed is stored into address 14. At step S5, the sub-routine of the multi-photometric operation shown in FIG. 16 is called, and a proper luminance value $BV_{ans}$ is calculated from the five photometric outputs $PV_0$-$PV_4$ stored in addresses 0B to 0F and the other set information. Advance is then made to step S6, where the operation of the exposure control amount is effected. That is, the calculated proper luminance value $BV_{ans}$ is developed in accordance with the set photography mode and the aperture value and the shutter speed to be controlled are determined. Finally, at step S7, the operation for display is effected on the basis of the proper luminance value $BV_{ans}$ and the port Phd 4 is controlled to thereby effect necessary display on the display device 36. When the processing of step S7 is completed, return is made to step S1, and the above-described process is repeated FIG. 12B is a flow chart of an interrupt process routine actuated by the exposure starting operation.

At step S71, the aperture control device 37 is driven by the port $P_5$ of the MCU 32 on the basis of the aperture control amount found at the step S6 of FIG. 12A and is controlled to an aperture value conforming to the set photography mode. At step S72, the shutter control device 38 is driven by the port $P_6$ of the MCU 32 on the basis of the shutter speed control amount also found at the step S6 and is controlled to a shutter speed conforming to the set photography mode. Thereby exposure is accomplished.

The sub-routines will now be described.

Sub-routine of A/D Conversion

The sub-routine shown in FIG. 13 is called from the step S1 of FIG. 12A. At step S11, "4" is set in a register x, and when at step S12, the content of the register X is transferred to the port $P_1$, "4" is set in the port $P_1$ at first. Thereby, "4" is set in the selective inputs $Q_2$-$Q_0$ of the multi-plexer MPX of the photometering circuit 31, and the photometric output $V_{p4}$ of the operational amplifier OP4 appearing at the input $IN_4$ of the multiplexer MPX is input to the A/D converter 33 through the output terminal OUT. When at step S13, A/D conversion is executed, the A/D converted value of the photometric output $V_{p4}$ is stored in an A/D conversion register ADR. Then, at step S14, the A/D converted value stored in the A/D conversion register ADR is transferred to the ADx (x=0−4: address 00-04) of the area RAM shown in Table 5. Since x=4 now, the data of the A/D conversion register ADR is stored as $AD_4$ of address 04. "1" is then subtracted from the data of the register X, and finally, if at step S15, x≧0, return is made to step S12, and the data of the register X changes from 4 to 3 and the aforedescribed processing is repeated, and the A/D converted value of the photometric output $V_{p3}$ is stored in address 03. Thereafter, in a similar manner, the A/D converted values $AD_0$-$AD_4$ of the photometric outputs $V_{p0}$-$V_{p4}$ are stored in address 00-04 until the sub-routine process is completed.

Sub-routine of Attitude Detection

FIG. 14 is a flow chart of the sub-routine of the attitude detection process, and this sub-routine is called from the step 2 of FIG. 12A. At step S21, the above-described attitude information input to the port $P_2$ is transferred to the register X. Here, the eight kinds of attitude data shown in Table 3 are input to the port $P_2$ in conformity with the attitude of the camera and therefore, 0-7 are stored in the register X as shown in Table 6 below. When the attitude of the camera is such as shown in FIGS. 10(e1) and (e2) or FIGS. 10(f1) and (f2), the switch SW2 is changed to any of ON and OFF as shown in Table 3 by a slight change in the attitude of the camera. That is, the switch SW2 may assume an indefinite state. Accordingly, the MCU 32 ignores the ON-OFF signal of the switch SW2 input to the port P2 at step S21, and discriminates the attitude of the camera on the basis of only the OF-ON signals of the switches SW1 and SW3. Then at step S22, the data PFLAG shown in Table 6 is referred to in conformity with the value of the register X, and the data is stored in the PFLAG of address 05.

TABLE 6

| FIG. 10 | REG X | PFLAG |
|---|---|---|
| b | 0 | 3 |
| e2 | 1 | 2 |
| d | 2 | 0 |
| e1 | 3 | 2 |
| f1 | 4 | 1 |
| c | 5 | 0 |
| f2 | 6 | 1 |
| a | 7 | 0 |

Thus, in the present embodiment, the attitude sensor 34 is comprised of three ON-OFF switches and there exist eight kinds of states, but the PFLAG stored as the attitude information in address 05 assumes four kinds of states, i.e., 0 to 3, which are less than the number of the actually existing states of the switches. With such a construction, even if the camera attitude is leftward and upward (FIGS. 10(e1) and (e2)), the states x=1 and x=3 can be assumed, but the PFLAG as the attitude information is made identical to thereby achieve stability of the control. Also, when the camera attitude is upward and downward (FIGS. 10(c) and 10(d)), the same PFLAG as that for the erect position (FIG. 10(a)) is 0. Generally, by taking into consideration which side of the object field is the sky side or the ground side, establishment in which a proper exposure is obtained can be achieved, but when the camera attitude is upward or downward, this can not be done and therefore, the erect position is adopted as the attitude information and the detecting switches are made to work so that even if they change, the variation in the result of the processing is rather small.

Rearrangement Sub-routine

FIG. 15 is a flow chart of the rearrangement sub-routine, and this sub-routine is called from the step S3 of FIG. 12A.

At step S31, whether the value of the attitude information PFLAG stored in the address 05 of the area RAM shown in Table 5 is 0 is discriminated, and if it is 0, shift is made to step S34, and if it is not 0, shift is made to step S32. Step S34 is executed when the attitude is erect, upward or downward, and transfers the A/D converted values $AD_0$-$AD_4$ stored in addresses 00-04 in succession as the photometric outputs $PV_0$-$PV_4$ to addresses 06-0A. Consequently, rearrangement does not take place.

At step S32, whether PFLAG is 1 is discriminated, and if it is 1, shift is made to step S35, and if it is not 1, shift is made to step S33.

Step S35 is executed when the camera attitude is rightward and upward, and the A/D converted value $AD_0$ of the middle portion is intactly transferred to address 06 as the photometric output $PV_0$ after rearrangement, the A/D converted value $AD_2$ of the right upper portion of the camera is transferred to address 07 as the sky side left photometric output $PV_1$, the A/D converted value $AD_4$ of the right lower portion of the camera is transferred to address 8 as the sky side right photometric output $PV_2$, the A/D converted value $AD_1$ of the left upper portion of the camera is transferred to address 09 as the ground side left photometric output $PV_3$, and the A/D converted value $AD_3$ of the left lower portion of the camera is transferred to address 0A as the ground side right photometric output $PV_4$.

At step S33, whether PFLAG is 2 is discriminated, and if it is 2, shift is made to step S36, and if it is not 2 (it is 3), shift is made to step S37.

Step S36 is executed when the camera attitude is leftward and upward. The A/D converted values of the middle portion, the left lower portion, the left upper portion, the right lower portion and the right upper portion of the camera are stored in addresses 06-0A as the photometric outputs $PV_0$-$PV_4$ after rearrangement in the order of $AD_0$, $AD_3$, $AD_1$, $AD_4$ and $AD_2$ (addresses 00, 03, 01, 04 and 02).

Also, step S37 is executed when the camera attitude is inverted. The A/D converted values are stored in addresses 06-0A as the photometric outputs $PV_0$-$PV_4$ after rearrangement in the order of $AD_0$, $AD_4$, $AD_3$, $AD_2$ and $AD_1$ (addresses 00, 04, 03, 02 and 01).

When the sub-routine process of FIG. 15 is executed as described above, the A/D converted values $AD_0$-$AD_4$ corresponding to the respective light receiving elements of the camera which are stored in addresses 00-04 are rearranged and normalized in conformity with the camera attitude by the attitude information of 0-3 of the PFLAG stored in address 05 and are stored into addresses 06-0A.

Sub-routine of Multi-photometric Operation

FIG. 16 is a flow chart of the sub-routine of the multi-photometric operation process program, and this sub-routine is called from the step S5 of FIG. 12A.

At step S51, 4 is set in the register X, and at step S52, addition of the data stored in a data area $PV_x$ distant by x from the address 06 of the area RAM of Table 5 and the APEX value AVO of the open aperture value stored in address 11 is effected, and the result of the addition is stored as a luminance value in a data area $BV_x$ distant by x from address 0B. Since x=4 when at first, the process of step S52 is effected, addition of the photometric output $PV_4$ stored in address 0A and the open aperture value AVO is effected and the result thereof is stored in address 0F as the luminance output $BV_4$ of the right lower portion. 1 is subtracted from the data of the register X and when at step S53, the result thereof is negative, advance is made to step S54, and when the result is positive, return is made to step S52. At first, 4 changes to 3 and therefore, return is made to step S52, where addition of $PV_3$ and AVO is effected and the result thereof is stored in $BV_3$ of address 0E. Thereafter, a similar process is repeated and, as the content of the register X changes to 2, 1 and 0, luminance outputs $BV_2$, $BV_1$ and $BV_0$ are stored in addresses 0D, 0C and 0B, respectively. At step S54, the values of the highest and lowest luminances are detected from among the luminance outputs $BV_0$-$BV_4$ stored in addresses 0B-0F, and those values are stored into addresses 15 and 17 as the maximum and minimum luminance values $BV_{max}$ and $BV_{min}$, respectively, and the mean of the five luminance outputs $BV_0$-$BV_4$ is calculated and the value thereof is stored into address 16 as the mean luminance value $BV_{mean}$, whereafter the minimum luminance value $BV_{min}$ stored in address 17 is subtracted from the maximum luminance value $BV_{max}$ stored in address 15, and the difference $\Delta BV$ therebetween is stored into address 18 as the luminance difference. At step S55, discrimination of $$5 \leq BV_{max} \leq 10 \qquad (1)$$

is effected, and when this formula (1) is established, advance is made to step S56, and when formula (1) is not established, jump is made to step S58. At step S56, comparison is made between $$BV_3 < BV_{mean} \qquad (2)$$

$$\text{and } BV_4 < BV_{mean} \qquad (3)$$

and when these two formulas are both established, advance is made to step S60, and when one of these two formulas is not established, advance is made to step S57. At this step S57, comparison is made between $$BV_0 \geq BV_{mean} \qquad (4)$$

$$BV_3 \geq BV_{mean} \qquad (5)$$

and $$BV_4 \geq BV_{mean} \qquad (6)$$

and when these formulas are all established, advance is made to step S59, and when one of these formulas is not established, advance is made to step S58.

In the above-described process, one of steps S58-S60 is executed in conformity with the state of the object field, i.e., the distribution of luminances $BV_0$-$BV_4$.

Step S60 is a step which is executed when formulas (1)-(3) are all established, and a value obtained by adding $BV_{min}$ to $BV_{mean}$ and dividing the result by 2 is stored into address 19 as the proper luminance value $BV_{ans}$. The condition under which formula (1) is established is within the range of EV10-15 of the maximum luminance value as converted into the EV value when the film speed is IS0100 (that is, SV=5), and is considered to correspond to a general outdoor scene. Also, a general back light scene is affected by the sky side condition such as the sky or clouds and is under-exposed. Now, the condition under which formulas (2) and (3) are established is that the left and right luminances $BV_3$ and $BV_4$ on the ground side are lower than the mean luminance value $BV_{mean}$, and corresponds to the general back light scene in which the ground is darker. That is, step S60 is executed in the case of the general outdoor back light scene, and $$(BV_{min}+BV_{mean})/2$$

is stored into address 19 as the proper exposure value $BV_{ans}$ so that the exposure is adjusted to the luminance side lower than the mean.

Step S59 is a step which is executed when formulas (1) and (4)-(6) are all established, and a value obtained by adding $BV_{max}$ to $BV_{mean}$ and dividing the result by 2 is stored into address 19 as the proper luminance value $BV_{ans}$. At this time, formula (1) is established and therefore, the then situation can be judged as a general outdoor scene. Also, the condition under which formulas (4)-(6) are established, unlike the condition under which formulas (2) and (3) are both established, is that the luminances $BV_0$, $BV_3$ and $BV_4$ of the middle portion and the ground side left and right portions in which the main object exists with high probability are higher than the mean, and the main object itself is considered to be bright. Consequently, $(BV_{max}+BV_{mean})/2$ is stored into address 19 as the proper exposure value $BV_{ans}$ so that the exposure is adjusted to the luminance side higher than the mean.

Step S58 is a step which is executed when formula (1) is not established or when neither of formulas (2) and (3) and formulas (4)-(6) is satisfied, and as a general scene, the mean luminance value $BV_{mean}$ is intactly stored into address 19 as the proper luminance value $BV_{ans}$.

When a general back light scene, i.e., an object which is light on the sky side and dark on the ground side, is to be photographed by the camera so constructed, the photometric value data stored in the respective areas are rearranged as follows.

(I) In the case where the camera attitude is the erect position

The middle portion is photometered by the light-receiving elements PD0 and PD0' and the photometric value thereof is stored into address 00 as an A/D converted value $AD_0$, the sky side is photometered by the light-receiving elements PD1 and PD2 and the photometric values thereof are stored into addresses 01 and 02 as A/D converted values $AD_1$ and $AD_2$, and the ground side is photometered by the light-receiving elements PD3 and PD4 and the photometric values thereof are stored into addresses 03 and 04 as A/D converted values $AD_3$ and $AD_4$. The A/D converted values $AD_0$-$AD_4$ stored in the respective addresses 00-04 are transferred to addresses 06-0A as photometric data $PV_0$-$PV_4$.

Let it be assumed that when the camera is leveled in its erect position as shown in FIG. 17A, the photometric outputs $V_{p0}$-$V_{p4}$ of the middle portion, the left upper portion, the right upper portion, the left lower portion and the right lower portion are EV13, 14, 17, 12 and 12 (when ISO is 100), respectively, as shown in FIG. 17B. At this time, the values 13, 14, 17, 12 and 12 as the A/D converted values $AD_0$–$AD_4$ after $V_{p0}$–$V_{p4}$ have been A/D-converted are successively stored in the addresses 00–04 of the RAM. That is, since the camera is in its erect position, the attitude information PFLAG is 0 with a result that rearrangement is not effected, and the photometric outputs $PV_0$–$PV_4$ after rearrangement are stored into addresses 06–0A in the order of 13, 14, 17, 12 and 12 (see FIG. 17C). At the step S52 of FIG. 16, the open aperture value AVO is added to these values, and the results of the addition are stored into the addresses as luminance values $BV_0$–$BV_4$.

At step S54, the maximum luminance value $BV_{max}$, the mean luminance value $BV_{mean}$, the minimum luminance value $BV_{min}$ and the luminance difference ABv are operated. Since a back light scene is present affirmative judgment is rendered at step S56, and at step S60, $(BV_{min}+BV_{mean})/2$ which provides exposure of low luminance is calculated as the proper luminance value $BV_{ans}$.

(II) In the case where the camera attitude is rightward and upward

The middle portion is photometered by the light-receiving elements PD0 and PD0' and the photometric value thereof is stored into address 00 as the A/D converted value $AD_0$, the sky side is photometered by the light-receiving elements PD2 and PD4 and the photometric values thereof are stored into addresses 02 and 04 as the A/D converted values $AD_1$ and $AD_2$, and the ground side is photometered by the light-receiving elements PD1 and PD3 and the photometric values thereof are stored into addresses 01 and 03 as the A/D converted values $AD_1$ and $AD_3$.

When the states of the switches of the attitude sensor are such as shown in any of FIGS. 10(f1) and (f2), the attitude information PFLAG becomes 1 as a result of the reference to Table 6, and the rearrangement shown at the step S35 of FIG. 15 is effected, and the A/D converted values $AD_2$ and $AD_4$ are transferred to addresses 07 and 08, and the A/D converted values $AD_1$ and $AD_3$ are transferred to addresses 09 and 0A, and they are normalized into $PV_1$, $PV_2$, $PV_3$ and $PV_4$, respectively. When a scene of the same luminance as the luminance of FIG. 18B is to be photographed with the camera leveled right-wardly and upwardly as shown in FIG. 18A, the photometric output of the middle portion is again EV13, but the photometric output of the light-receiving element PD1 in the left upper portion changes from EV14 to EV12. Likewise, the photometric output of the light-receiving element PD2 in the right upper portion changes from EV17 to EV14, the photometric output of the light-receiving element PD3 in the left lower portion becomes EV12, and the photometric output of the light receiving element PD4 in the right lower portion changes from EV12 to EV17. Accordingly, in the addresses 00–04 of the RAM, the values 13, 12, 14, 12 and 17 are stored as the A/D converted values $AD_0$–$AD_4$ in the named order. Since the attitude information PFLAG becomes 1, rearrangement is effected and the photometric outputs $PV_0$–$PV_4$ after rearrangement are stored into addresses 06–07 in the order of 13, 14, 17, 12 and 12 (see FIG. 18C). Consequently, the subsequent processing becomes similar to the preceding processing and the same exposure as that when the camera is leveled in its erect position can be obtained.

(III) In the case where the camera attitude is leftward and upward.

The middle portion is photometered by the light-receiving elements PD0 and PD0' and the photometric value thereof is stored into address 00 as the A/D converted value $AD_0$, the sky side is photometered by the light-receiving elements PD3 and PD1 and the photometric values thereof are stored into addresses 03 and 01 as the A/D converted values $AD_3$ and $AD_1$, and the ground side is photometered by the light-receiving elements PD4 and PD2 and the photometric values thereof are stored into addresses 04 and 02 as the A/D converted values $AD_4$ and $AD_2$.

When the states of the switches of the attitude sensor are such as shown in any of FIGS. 10(e1) and (e2), the attitude information PFLAG becomes 2 as a result of the reference to Table 6, and the rearrangement shown at the step S36 of FIG. 15 is effected, and the A/D converted values $AD_3$ and $AD_1$ are transferred to addresses 07 and 08 and the A/D converted values $AD_4$ and $AD_2$ are transferred to addresses 09 and 0A, and they are normalized into $PV_1$, $PV_2$, $PV_3$ and $PV_4$, respectively. Consequently, the subsequent processing becomes similar to the preceding processing and the same exposure as that when the camera is leveled in its erect position can be obtained.

(IV) In the case where the camera is inverted

The middle portion is photometered by the light-receiving elements PD0 and PD0' and the photometric value thereof is stored into address 00 as the A/D converted value $AD_0$, the sky side is photometered by the light-receiving elements PD4 and PD3 and the photometric values thereof are stored into addresses 04 and 03 as the A/D converted values $AD_4$ and $AD_3$, and the ground side is photometered by the light-receiving elements PD2 and PD1 and the photometric values thereof are stored into addresses 02 and 01 as the A/D converted values $AD_2$ and $AD_1$.

The states of the switches of the attitude sensor are such as shown in FIG. 10(b) and the attitude information PFLAG becomes 3 as a result of the reference to Table 6, and the rearrangement shown at the step S37 of FIG. 15 is effected, and the A/D converted values $AD_4$ and $AD_3$ are transferred to addresses 07 and 08 and the A/D converted values $AD_2$ and $AD_1$ are transferred to addresses 09 and 0A, and they are normalized into $PV_1$, $PV_2$, $PV_3$ and $PV_4$, respectively. Consequently, the subsequent processing becomes similar to the preceding processing and the same exposure as that when the camera is leveled in its erect position can be obtained.

As described above, in the case of the same scene, a predetermined exposure result is obtained irrespective of the camera attitude.

Thus, in the present embodiment, $2^N$ pieces of attitude information obtained from N attitude sensors are classified into less pieces of attitude information than $2^N$ and therefore, the processing such as exposure operation thereafter is simplified.

We claim:

1. A camera comprising:
a penta-roof prism provided between a photo-taking lens and a finder optical system and having plural planes, said plural planes including an incidence plane on which light from said photo-taking lens is incident, an emergence plane ;from which light from said incidence plane is emitted toward said finder optical system, and at least one inclined plane in addition to said incidence plane and said emergence plane, said inclined plane being tilted with respect to said incidence plane;

at least one sensor disposed at a position facing said inclined plane at the outside of said penta-roof prism, said sensor having a measurement axis substantially parallel to said inclined plane and tilted with respect to said incidence plane, and said sensor producing an output dependent upon inclination of said measurement axis; and attitude detecting means for detecting the attitude of said camera in response to said output of said sensor.

2. A camera according to claim 1, wherein said sensor is so disposed that said measurement axis is tilted with respect to both said incidence plane and said emergence plane and so that said axis is tilted with respect to a plane perpendicular to said incidence plane and said emergence plane.

3. A camera according to claim 1, wherein said sensor has a tubular shape extending lengthwise in the direction of said measurement axis.

4. A camera according to claim 3, further comprising a cover surrounding the periphery of said penta-roof prism in such a manner that a space is formed between said cover and said penta-roof prism and wherein said sensor is disposed within said space.

5. A camera comprising:

a penta-roof prism provided between a photo-taking lens and a finder optical system and having plural planes, said plural planes including an incidence plane on which light from said photo-taking lens is incident, an emergence plane ;from which light from said incidence plane is emitted toward said finder optical system, and plural inclined planes in addition to said incidence plane and said emergence plane, said plural inclined planes being tilted with respect to said incidence plane in different directions;

plural sensors respectively disposed at positions opposed to corresponding inclined planes at the outside of said penta-roof prism, said of said sensors having a measurement axis substantially parallel to the corresponding inclined plane and tilted with respect to said incidence plane, and each of said sensors producing an output dependent upon inclination of its measurement axis; and attitude detecting means for detecting the attitude of said camera in response to said outputs of said plural sensors.

6. A camera according to claim 5, wherein each of said sensors has a tubular shape extending lengthwise in the direction of its measurement axis.

7. A camera according to claim 5, further comprising a cover surrounding the periphery of said penta-roof prism in such a manner that a space is formed between said cover and said penta-roof prism, and wherein said plural sensors are disposed within said space.

8. A camera according to claim 5, wherein said plural inclined planes are reflecting planes for forming an optical path between said incidence plane and said emergence plane.

9. A camera according to claim 8, wherein said reflecting planes include two inclined roof planes positioned opposed to said incidence plane and wherein said plural sensors include first and second sensors substantially parallel to said two inclined roof planes, respectively.

10. A camera comprising:

N sensors inclined in different directions on said camera and each responsive to variations in the direction of gravity caused by changes of the attitude of said camera to produce either of first and second state outputs independently of the outputs of the other sensors and such that different permutations of first and second state outputs are produced depending on the attitude of said camera, where $N \geq 2$;

means for classifying $2^N$ pieces of information obtained from a combination of said outputs of said N sensors into less than $2^N$ pieces of attitude information;

and means for determining the attitude of said camera based upon the classified attitude information.

11. A camera comprising:

three sensors inclined in different directions and each responsive to variations in the direction of gravity caused by changes of the attitude of said camera to produce either of first and second state outputs independently of the outputs of the other sensors;

combinations of said outputs of said three sensors differing dependent upon the attitude of said camera, said camera being capable of assuming any one of first to sixth attitudes, including first to fourth attitudes in which the optical axis of a photo-taking lens of the camera is horizontal and the camera has different orientations respectively displaced by 90° about the optical axis, and fifth and sixth attitudes in which the optical axis is directed upward and downward, respectively;

means for classifying a number of pieces of attitude information obtained by combination of said outputs of said three sensors into a smaller number of pieces of information, said classifying including treating information corresponding to said first, fifth and sixth attitudes as the same classification type; and means for determining the attitude of said camera based upon the classified attitude information.

12. A camera comprising:

photometric means for dividing an object field into plural areas, photometering them, and producing photometric data for each of said plural areas;

attitude detecting means for detecting the attitude of said camera and producing attitude information;

memory means having plural memory positions for storing said photometric data;

means for determining, in response to said attitude information, addresses designating memory positions at which said photometric data is stored;

means for sequentially forwarding said photometric data to said addresses; and means for reading out said photometric data stored in said memory means and determining a proper exposure value corresponding to said object field.

13. A camera according to claim 12, wherein said reading means includes means for sequentially accessing said plural memory positions of said memory means in accordance with a predetermined order and for judging status of said object field from photometric data stored at said memory positions.

14. A camera according to claim 12, wherein said address determining means includes means for changing a correspondence between said plural areas and said plural memory positions in response to said attitude information.

15. A camera according to claim 12, wherein said forwarding means rearranges photometric data in accordance with addresses determined by said address determining means.

* * * * *